United States Patent [19]

Farone

[11] 3,953,395

[45] Apr. 27, 1976

[54] NOVEL COMPOSITIONS SUITABLE FOR MOLDING

[75] Inventor: Eugene Richard Farone, Mentor, Ohio

[73] Assignee: The Lubrizol Corporation, Cleveland, Ohio

[22] Filed: Aug. 28, 1974

[21] Appl. No.: 501,126

Related U.S. Application Data

[63] Continuation-in-part of Ser. No. 423,337, Dec. 10, 1973, abandoned.

[52] U.S. Cl. ............................ 260/40 R; 260/37 N; 260/861
[51] Int. Cl.² ........................................ C08L 67/06
[58] Field of Search ................. 260/40 R, 861, 835, 260/37 N

[56] References Cited

UNITED STATES PATENTS

| | | | |
|---|---|---|---|
| 3,555,111 | 1/1971 | Benbam | 260/835 |
| 3,632,667 | 1/1972 | Baum | 260/861 |
| 3,825,517 | 7/1974 | Ficarra | 260/40 R |

FOREIGN PATENTS OR APPLICATIONS 993,378   5/1965   United Kingdom ................. 260/861

OTHER PUBLICATIONS

Bjorksten, *Polyesters and Their Applications*, (1956) pp. 48 & 49.

*Primary Examiner*—Donald E. Czaja
*Assistant Examiner*—S. M. Person
*Attorney, Agent, or Firm*—James W. Adams, Jr.; William H. Pittman

[57] ABSTRACT

Novel systems, useful in molding and in prepreg formation, contain two components capable of reacting to form an infusible material. The two components are preferably an unsaturated polyester and a crosslinker comprising a substituted acrylamide or similar compound. The systems are substantially non-volatile; solid at ambient temperatures; liquid, homogeneous and non-reactive at higher temperatures; readily and reversibly convertible from solid to liquid; and capable of conversion to said infusible material at still higher temperatures.

30 Claims, No Drawings

NOVEL COMPOSITIONS SUITABLE FOR MOLDING

This application is a continuation-in-part of copending application Ser. No. 423,337, filed Dec. 10, 1973, and now abandoned.

This invention relates to new compositions of matter having an unusual combination of properties which render them particularly useful in the formulation of prepregs and sheet and bulk molding compositions. More particularly, it relates to compositions of matter which are substantially non-volatile;

solid and substantially storage stable within a lower temperature range which includes ambient and normal storage temperatures;

liquid, homogeneous, substantially non-reactive and capable of wetting or saturating a filler or reinforcing medium and thereafter remaining liquid within an intermediate temperature range which includes temperatures between about 50° and 135°C.;

readily and reversibly convertible from the solid to the liquid state by varying the temperature between said lower and intermediate ranges;

capable of being chemically converted to an infusible state within a higher temperature range, but liquid until so converted;

said composition comprising

A. at least one component which is capable of chemical conversion to an infusible state by reaction with at least one other reagent; and B. a component or combination of components capable of reaction with component A to cause said chemical conversion.

Sheet and bulk molding compositions are well known in the art. Many of them are described in "New and Novel SMC and BMC Compounds", a paper given by Frank Fekete at the 1973 Reinforced Plastics/Composites Institute Of The Society Of The Plastics Industry, Inc. In general, these compositions or at least the chemically active constituents thereof are liquid at room temperatures; those that are solid are made so by the addition of inert fillers in varying amounts, which amounts are often high with respect to the amount of reactive material. The presence of such fillers, which are incapable of being homogeneously dispersed in the system at any temperature, complicates the handling and use of the molding composition.

It is also conventional to impregnate a continuous or partially continuous reinforcing medium, such as paper or a glass fiber mat, with a curable composition to form a "prepreg". The prepreg, or a plurality thereof, may then be laminated, used to coat other surfaces or the like and subsequently cured.

In U.S. Pat. Re. No. 27,722, there are described solvent-free compositions comprising a polyester in combination with an N-3-oxohydrocarbon-substituted acrylamide, preferably diacetone acrylamide. While these systems are very useful in SMC and BMC work and especially for prepreg formation, it is of interest to develop alternative systems, particularly systems which contain more readily available and inexpensive ingredients, and which at the same time possess the useful properties of the diacetone acrylamide-containing systems. The present invention comprises alternative curable compositions of this type, defined in terms of both their properties and the ingredients which go into them.

The first characteristic property of the compositions of this invention is substantial non-volatility. This requires that the compositions be substantially free of volatile solvents. Non-volatile solvents or diluents may sometimes be used in relatively small amounts (typically up to about 10% based on the combined weight of components A and B as defined hereinafter), but they are generally unnecessary and it is preferred that they be entirely absent whenever possible. Similar amounts of non-volatile plasticizing substances such as glycerol, trimethylolpropane or 1, 4-butanediol may also be present, as described hereinafter.

The compositions are also solid and substantially storage stable within a lower temperature range. At this temperature, the composition is frequently a "solid solution" of one component in the other, although its exact physical nature is irrelevant to the purposes of this invention. What is important is that the compositions are solid at ambient and normal storage temperatures (usually up to about 35°C.) and are substantially incapable of curing or other reaction at those temperatures.

Within an intermediate temperature range, the compositions are liquid and homogeneous. (It will be apparent from the property of homogeneity that fillers do not contribute appreciably to the advantageous properties of the compositions of this invention, although fillers may be present for other reasons as described hereinafter.) When within this intermediate range, the compositions of this invention remain non-reactive and non-curing, and they are capable of wetting or saturating fillers and reinforcing media without themselves solidifying. They preferably have Brookfield viscosities at 200°F. (93°C.) lower than about 10,000 cp., although viscosity is not a limiting property for the purposes of this invention. The intermediate temperature range includes temperatures between about 50° and 135°C., and especially between about 95° and 135°C., but it need not include all temperatures within those limits and its exact location on the temperature scale is otherwise irrelevant except that it does not include ambient and normal storage temperatures, at which the compositions are solid as previously noted.

An important property of the compositions of this invention is their reversible convertibility from the solid to the liquid state. Transition between these two states can be effected by merely heating the solid material to a temperature within the intermediate range, or by cooling the liquid material to a temperature within the lower range. This heating and cooling can be done repeatedly without causing curing or other reaction of the composition; that is, there is no hysteresis resulting from conversion between the lower and intermediate ranges. Further, there is no "advancement" of the composition within the intermediate range; that is, it does not cure during substantial "pot life" periods.

At temperatures within a higher range (which typically includes temperatures between about 120° and 150°C.), the components of the composition interract to form an infusible solid material. (By "infusible" is meant that the composition does not liquefy thereafter, although it may soften somewhat with strong heating.) The reaction is ordinarily a crosslinking or curing reaction of the type that is familiar to those in the polymer art. It is important to note that the curing reaction does not take place within the intermediate temperature range, but requires a threshold temperature above that of the intermediate range. Moreover, the composition remains liquid until curing takes place.

The compositions of this invention comprise two essential ingredients which are capable of chemical interreaction, within the higher temperature range referred to hereinabove, to form an infusible material. In many of the preferred compositions, component A is an unsaturated polyester and component B is a polymerizable unsaturated cross-linking monomer capable of reaction with said polyester under free radical conditions. (When used herein, the singular form "a", "an", "the" and the like includes the plural except where clearly inappropriate.) Typical unsaturated polyesters may be prepared by the reaction of an aliphatic polyhydroxy compound with one or more polybasic (preferably dibasic) carboxylic acids, or anhydrides thereof, at least a portion of which contain a polymerizable double bond. Among the polyhydroxy compounds which may be used are ethylene glycol, propylene glycol, diethylene glycol, dipropylene glycol, glycerol and the like. Suitable unsaturated acids include maleic, fumaric, itaconic and citraconic acids. It is also within the scope of the invention to use, in combination with said unsaturated acid, a non-polymerizable polycarboxylic acid such as phthalic, isophthalic, terephthalic, succinic or adipic acid or halogenated derivatives thereof. A typical polyester which is prepared by the reaction of about 2.0–2.5 moles of at least one aliphatic polyhydroxy compound with about 0.4–2.0 moles of the polymerizable unsaturated dicarboxylic acid or anhydride and about 0–0.16 moles of the nonpolymerizable dicarboxylic acid or anhydride. Unsaturated polyesters of this type are commercially available and the commercial materials are suitable for use in the preparation of the compositions of this invention. A typical one is sold by Owens-Corning under the designation "E-720".

When component A is an unsaturated polyester, component B may be one or more unsaturated monomers which are reactive with said polyester under free radical conditions. The monomer will be chosen in accordance with its capability of forming, with the polyester, a system having the properties described hereinabove, and those skilled in the art and familiar with the present invention as described herein will be able to choose monomers suitable for particular purposes. Illustrative monomers are:

| | |
|---|---|
| N-Isopropylacrylamide | N-Phenylmethacrylamide |
| N-t-Butylacrylamide | N-2-Bornylmethacrylamide |
| N-t-Pentylacrylamide | 3-Methyl-2-butenoic acid |
| N-Diisobutylacrylamide | Crotonic acid |
| N-Benzylacrylamide | Dihydroabietyl fumarate |
| N-1-Phenylethylacrylamide | Allylurea |
| 3-Acrylamido-3-methylbutanoic acid | N-Vinylsuccinimide |
| N-t-Butylmethacrylamide | Tribromophenyl allyl ether |

The compounds preferred as crosslinking monomers for use with polyesters to produce compositions of this invention are the N-hydrocarbon-substituted acrylamides and methacrylamides in which the substituent is an alkyl, cycloalkyl, aryl or aralkyl radical containing up to about 10 carbon atoms, as well as allylurea and N-vinylsuccinimide. The acrylamides and methacrylamides are especially preferred.

It is also within the scope of this invention to use as component A a substance capable of yielding a polyisocyanate at elevated temperatures. Such substances include, for example, bis-(N,N-diphenylureas) of the formula

wherein R is a divalent radical such as a tolylene or alkylene radical. These substances may be prepared by the reaction of a diisocyanate with diphenylamine, and suitable diisocyanates are well known in the art. Other polyisocyanate-yielding substances include diaminimides of the formula

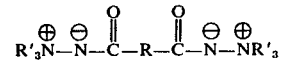

wherein R is as defined above and each R' individually is typically a lower alkyl or hydroxyalkyl radical. Such diaminimides are disclosed in U.S. Pat. No. 3,450,673, the pertinent disclosure of which is incorporated by reference herein.

Either of these polyisocyanate-yielding materials, which are normally solids, may be blended with a suitable solid polyol or polyamine at an elevated temperature below the polyisocyanate-yielding temperature, and the resulting substance may be cooled to room temperature to form a solid blend. When the aminimides are heated above about 120°C., or the bis-(N,N-diphenylureas) above about 150°C., they decompose to liberate polyisocyanate which reacts with the polyol or polyamine to yield an infusible polyurethane or polyurea.

The relative proportions of components A and B may be varied within relatively wide limits, subject only to the condition that they interract to form a cured product which does not contain either unreacted component in an amount detrimental to the properties thereof. Generally, the weight ratio of component A to component B will be between about 0.8:1 and 2:1.

The compositions of this invention are useful, as previously indicated, in the formulation of sheet and bulk molding compositions and prepregs. For this purpose, they are ordinarily combined with substantially inert fillers or reinforcing media (sometimes collectively referred to hereinafter as "fillers" for convenience). The filled compositions may contain very large amounts of filler, up to about 2.5 parts by weight per part of the combination of components A and B. It has already been mentioned that said combination, within the intermediate temperature range, is uniquely capable of effectively wetting a filler. Suitable fillers include cotton flock, cellulose flock, wood flour, asbestos fiber, random glass fiber, glass fiber matting, calcium carbonate, alumina, glass rovings, asbestos shorts, Asbestine, cellulose or slate flour. Others will be readily apparent to those skilled in the art and include the fillers described in *Modern Plastics Encyclopedia*, 1969–1970, pp. 372–396 (New York: McGraw-Hill, Inc.).

In addition to components A and B and fillers or reinforcing media as described hereinabove, the prepregs and molding compositions of this invention may contain other ingredients. For example, when component A is an unsaturated polyester and component B a crosslinking monomer therefor, the compositions will ordinarily also contain a minor amount of a free radical polymerization catalyst, typically a peroxide such as benzoyl peroxide, acetyl peroxide, t-butyl perbenzoate or others known to those skilled in the art. However, radiation curing of such compositions is also within the scope of this invention and when it is employed, the presence of a catalyst is unnecessary. Other ingredients which may be present in minor amounts include inhibitors such as hindered phenols, mold release agents such as salts of fatty acids, and anti-shrink or "low profile" additives such as suspension-polymerized polyvinyl acetate.

Pigments may also be incorporated in the compositions of this invention. These usually comprise hiding white pigments, other tints and colors ordinarily being obtained by mixing other colored paint pigments with the white pigments. Any of the inorganic and organic pigments, pigment lakes, insoluble dyes and other durable coloring matter ordinarily used in formulating durable exterior paints, varnishes, enamels and lacquers can be used. Typical useful white hiding pigments are rutile titanium dioxide, anatase titanium dioxide, zinc oxide, leaded zinc oxide, zinc sulfide, lead titanate, antimony oxide, zirconium oxide, white lead, basic lead silicate, lithopone, titanated lithopone, titanium-barium pigment, titanium-calcium pigment and titanium-magnesium pigment. The titanium dioxide pigments ordinarily are preferred.

While the pigmentation can be solely of hiding prime pigments, it is economically impractical to use solely prime pigments at high pigment volume concentrations. Therefore, total pigments usually consist of hiding prime pigments extended with well-known pigment extenders such as calcium carbonate, gilders white talc, barytes, magnesium silicate, aluminum silicates, diatomaceous earth, china clay, Asbestine, silica or mica. The relative proportions of the prime white pigment and the pigment extender may be varied widely, but usually the hiding prime pigment is present at a pigment volume concentration which provides the desired hiding and the extender pigment is present in an amount which provides the composition with the desired total pigment volume concentration. Prime pigments and extender pigments range widely in density, but ordinarily white compositions and light tints have a pigment composition whereof the extender pigment is present in the weight proportion of 0.4–4.0 parts per part of hiding prime pigment. In addition to the white pigments and extenders mentioned above, colored pigments may be used. Examples of these are iron oxide, chrome oxide, chrome yellow, toluidene red, hansa yellow, phthalocyanine blues and greens, red lead and zinc chromate.

It may sometimes be desirable to impart additional flexibility to the compositions of this invention at temperatures below those of molding and curing. This may be done by incorporating a minor amount (preferably no more than about 10% based on the combined weight of components A and B, and usually 5% or less) of a plasticizer (usually a polyhydroxy compound such as glycerol, trimethylolpropane or 1,4-butanediol) in the composition during blending thereof. In addition to improving "drape" capability, the plasticizer also decreases viscosity within the intermediate temperature range.

The preparation and use of the compositions of this invention are illustrated by the following examples. All parts are by weight.

EXAMPLES 1–15

Polyester-monomer compositions are prepared by melting 40 parts of the monomer, adding 0.06 part of 2,6-di-t-butyl-p-cresol thereto, and blending the same with 60 parts of a polyester prepared from about 1 mole of isophthalic acid, 1 mole of maleic anhydride and 2.2 moles of propylene glycol. The blending is done at a temperature at which all ingredients are liquid. t-Butyl perbenzoate, 1 part, is then added and the mixture is blended thoroughly and allowed to cool to room temperature, whereupon it solidifies. The composition is cured by heating to 150°C. for about 15 minutes, yielding an infusible, thermoset solid.

The monomers used and the conditions of blending are listed in the following table.

| Example | Monomer | Monomer temp., °C. | Polyester temp., °C. |
|---|---|---|---|
| 1 | N-Isopropylacrylamide | 93 | 125 |
| 2 | N-t-Butylacrylamide | 135 | 135 |
| 3 | N-t-Pentylacrylamide | 96 | 135 |
| 4 | N-Diisobutylacrylamide | 93 | 125 |
| 5 | N-Benzylacrylamide | 93 | 125 |
| 6 | 3-Acrylamido-3-methyl-butanoic acid | 100 | 125 |
| 7 | N-t-Butylmethacrylamide | 93 | 125 |
| 8 | N-Phenylmethacrylamide | 93 | 125 |
| 9 | N-2-Bornylmethacrylamide | 93 | 121 |
| 10 | 3-Methyl-2-butenoic acid | 93 | 125 |
| 11 | Crotonic acid | 93 | 121 |
| 12 | Dihydroabietyl fumarate | 93 | 130 |
| 13 | Allylurea | 93 | 125 |
| 14 | N-Vinylsuccinimide | 93 | 125 |
| 15 | Tribromophenyl allyl ether | 93 | 121 |

EXAMPLE 16

A blend of 40 parts of allylurea and 0.06 part of 2,6-di-t-butyl-p-cresol is heated to 93°C., whereupon it liquefies. Sixty parts of the polyester of Examples 1–15, heated to 150°C., is added, followed by 100 parts of hydrated alumina as a filler. The mixture is heated at 93°C. and 2 parts of t-butyl perbenzoate is added. Upon cooling to room temperature, the mixture solidifies. A portion thereof is cured by heating at 150°C. for 15 minutes.

EXAMPLE 17

A mixture of 49.1 parts of N-diisobutylacrylamide and 0.06 part of 2,6-di-t-butyl-p-cresol is heated to above the melting point, and 50.9 parts of a polyester prepared from 1 mole of isophthalic acid, 3 moles of maleic anhydride, 3 moles of propylene glycol and 1.2 moles of a dipropylene glycol is added slowly. There are then added 132.8 parts of hydrated alumina and 3.2 parts of zinc stearate. The mixture is allowed to cool to below 93°C. and 1.4 parts of t-butyl perbenzoate is added.

The filled mixture thus obtained is coated onto 1-inch chopped glass rovings to form a sheet 46 mils thick, said sheet containing about 20% chopped glass. The product is a sheet molding composition which may be molded within 4 minutes under 100 psi. pressure at 138°C.

EXAMPLE 18

A sheet molding composition similar to that of Example 17 is prepared, except that the monomer used is N-1-phenylethylacrylamide. It is similarly molded.

EXAMPLE 19

A mixture of 50 parts of N-diisobutylacrylamide and 0.8 part of 2,6-di-t-butyl-p-cresol heated to 82°C. (above the melting point) and 15 parts of a suspension-polymerized polyvinyl acetate is added, followed by 50 parts of the polyester of Example 19. The mixture is filtered and 187.5 parts of calcium carbonate and 5.2 parts of zinc stearate are added with thorough mixing, followed by 4.5 parts of glycerol and 1.14 parts of t-butyl perbenzoate.

A sheet molding composition capable of curing at 150°C. is prepared by coating the polyester onto glass rovings as described in Example 17.

What is claimed is:

1. A composition of matter which has a Brookfield viscosity at 93°C. lower than about 10,000 cp. and which is substantially non-volatile;

solid and substantially storage stable within a lower temperature range which includes ambient and normal storage temperatures;

liquid, homogeneous, substantially non-reactive and capable of wetting or saturating a filler or reinforcing medium and thereafter remaining liquid within an intermediate temperature range which includes temperatures between about 50° and 150°C.;

readily and reversibly convertible from the solid to the liquid state by varying the temperature between said lower and intermediate ranges;

capable of being chemically converted to an infusible state within a higher temperature range, but liquid until so converted;

said composition comprising

A. at least one component which is capable of chemical conversion to an infusible state by reaction with at least one other reagent; and B. a component or combination of components capable of reaction with component A to cause said chemical conversion;

the weight ratio of component A to component B being between about 0.8:1 and 2:1;

with the proviso that when component A is an unsaturated polyester, component B is not an N-3-oxohydrocarbon-substituted acrylamide 2. A composition according to claim 1 wherein component A is an unsaturated polyester and component B is at least one polymerizable unsaturated crosslinking monomer capable of reaction with said polyester under free radical conditions.

3. A composition according to claim 2 wherein component B is allylurea, N-vinylsuccinimide, or an N-hydrocarbon-substituted acrylamide or methacrylamide in which the substituent is an alkyl, cycloalkyl, aryl or aralkyl radical containing up to about 10 carbon atoms.

4. A composition according to claim 2 wherein component B is at least one of the following:

| | |
|---|---|
| N-Isopropylacrylamide | N-Phenylmethacrylamide |
| N-t-Butylacrylamide | N-1-Naphthylmethacrylamide |
| N-t-Pentylacrylamide | N-2-Bornylmethacrylamide |
| N-Diisobutylacrylamide | 3-Methyl-2-butenoic acid |
| N-Benzylacrylamide | Crotonic acid |
| N-1-Phenylethylacrylamide | Dihydroabietyl fumarate |
| 3-Acrylamido-3-methyl-butanoic acid | Allylurea |
| Methacrylamide | N-Vinylsuccinimide |
| N-t-Butylmethacrylamide | Tribromophenyl allyl ether. |

5. A composition of matter comprising the composition of claim 1 in combination with a substantially inert filler, up to about 2.5 parts by weight of said filler being present per part of the composition of claim 1.

6. A composition of matter comprising the composition of claim 2 in combination with a substantially inert filler, up to about 2.5 parts by weight of said filler being present per part of the composition of claim 2.

7. A composition of matter comprising the composition of claim 3 in combination with a substantially inert filler, up to about 2.5 parts by weight of said filler being present per part of the composition of claim 3.

8. An infusible composition prepared by curing the composition of claim 1 at a temperature within said higher temperature range.

9. An infusible composition prepared by curing the composition of claim 2 at a temperature within said higher temperature range.

10. An infusible composition prepared by curing the composition of claim 3 at a temperature within said higher temperature range.

11. An infusible composition prepared by curing the composition of claim 4 at a temperature within said higher temperature range.

12. An infusible composition prepared by curing the composition of claim 5 at a temperature within said higher temperature range.

13. An infusible composition prepared by curing the composition of claim 6 at a temperature within said higher temperature range.

14. An infusible composition prepared by curing the composition of claim 7 at a temperature within said higher temperature range.

15. A composition according to claim 1 wherein the intermediate temperature range includes temperatures between about 95° and 135°C.

16. A composition according to claim 15 wherein component A is an unsaturated polyester and component B is at least one polymerizable unsaturated crosslinking monomer capable of reaction with said polyester under free radical conditions.

17. A composition according to claim 16 wherein component B is allylurea, N-vinylsuccinimide, or an N-hydrocarbon-substituted acrylamide or methacrylamide in which the substituent is an alkyl, cycloalkyl, aryl or aralkyl radical containing up to about 10 carbon atoms.

18. A composition according to claim 16 wherein component B is a least one of the following:

| | |
|---|---|
| N-Isopropylacrylamide | N-Phenylmethacrylamide |
| N-t-Butylacrylamide | N-1-Naphthylmethacrylamide |
| N-t-Pentylacrylamide | N-2-Bornylmethacrylamide |
| N-Diisobutylacrylamide | 3-Methyl-2-butenoic acid |
| N-Benzylacrylamide | Crotonic acid |
| N-1-Phenylethylacrylamide | Dihydroabietyl fumarate |
| 3-Acrylamido-3-methyl-butanoic acid | Allylurea |
| Methacrylamide | N-Vinylsuccinimide |
| N-t-Butylmethacrylamide | Tribromophenyl allyl ether. |

19. A composition of matter comprising the composition of claim 15 in combination with a substantially inert filler, up to about 2.5 parts by weight of said filler being present per part of the composition of claim 15.

20. A composition of matter comprising the composition of claim 16 in combination with a substantially inert filler, up to about 2.5 parts by weight of said filler being present per part of the composition of claim 16.

21. A composition of matter comprising the composition of claim 17 in combination with a substantially inert filler, up to about 2.5 parts by weight of said filler being present per part of the composition of claim 17.

22. A composition of matter comprising the composition of claim 18 in combination with a substantially inert filler, up to about 2.5 parts by weight of said filler being present per part of the composition of claim 18.

23. An infusible composition prepared by curing the composition of claim 15 at a temperature within said higher temperature range.

24. An infusible composition prepared by curing the composition of claim 16 at a temperature within said higher temperature range.

25. An infusible composition prepared by curing the composition of claim 17 at a temperature within said higher temperature range.

26. An infusible composition prepared by curing the composition of claim 18 at a temperature within said higher temperature range.

27. An infusible composition prepared by curing the composition of claim 19 at a temperature within said higher temperature range.

28. An infusible composition prepared by curing the composition of claim 20 at a temperature within said higher temperature range.

29. An infusible composition prepared by curing the composition of claim 21 at a temperature within said higher temperature range.

30. An infusible composition prepared by curing the composition of claim 22 at a temperature within said higher temperature range.

* * * * *